(12) United States Patent
Swift et al.

(10) Patent No.: US 10,526,897 B2
(45) Date of Patent: Jan. 7, 2020

(54) COOLING PASSAGES FOR GAS TURBINE ENGINE COMPONENT

(71) Applicant: United Technologies Corporation, Hartford, CT (US)

(72) Inventors: Anthony B. Swift, North Waterboro, ME (US); Paul M. Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 736 days.

(21) Appl. No.: 14/870,175

(22) Filed: Sep. 30, 2015

(65) Prior Publication Data

US 2017/0089204 A1 Mar. 30, 2017

(51) Int. Cl.
| F01D 1/00 | (2006.01) |
| F01D 5/18 | (2006.01) |
| F01D 9/02 | (2006.01) |
| F01D 11/08 | (2006.01) |
| F01D 25/12 | (2006.01) |
| F23R 3/00 | (2006.01) |
| F02C 3/04 | (2006.01) |

(52) U.S. Cl.
CPC ............... F01D 5/186 (2013.01); F01D 9/02 (2013.01); F01D 11/08 (2013.01); F01D 25/12 (2013.01); F23R 3/002 (2013.01); F02C 3/04 (2013.01); F05D 2220/32 (2013.01); F05D 2260/202 (2013.01)

(58) Field of Classification Search
CPC .......... F01D 5/186; F01D 11/08; F01D 25/12; F01D 11/24; F01D 5/187; F23R 3/002; F23R 2900/03041; F23R 2900/03042; F23R 2900/03043; F05D 2260/202; F05D 2260/203; F05D 2240/11; F05D 2240/81; F02C 7/18
See application file for complete search history.

(56) References Cited

U.S. PATENT DOCUMENTS 5,181,379 A 1/1993 Wakeman et al.
5,649,806 A 7/1997 Scricca et al.
(Continued)

FOREIGN PATENT DOCUMENTS

| EP | 000623189 B1 * | 4/1997 | ............ F01D 11/122 |
| EP | 1762705 A1 | 3/2007 | |
| WO | 9412775 A1 | 6/1994 | |

OTHER PUBLICATIONS

European Search Report for European Application No. 16191964.2 dated Mar. 29, 2017.

Primary Examiner — Craig Kim
Assistant Examiner — Edwin Kang
(74) Attorney, Agent, or Firm — Carlson, Gaskey & Olds, P.C.

(57) ABSTRACT

A gas turbine engine component includes a wall portion that includes a first side and a second opposite side. A plurality of passages extends between the first side of the wall portion and the second side of the wall portion and includes a plurality of inlets located on the first side of the wall portion. A plurality of outlets are located on a second side of the wall portion. The plurality of outlets include a first plurality of outlets located on a first side of the plurality of inlets and a second plurality of outlets located on a second side of the plurality of inlets.

18 Claims, 4 Drawing Sheets

(56) References Cited

U.S. PATENT DOCUMENTS

| | | | |
|---|---|---|---|
| 6,243,948 B1 | 6/2001 | Lee et al. | |
| 7,296,967 B2 * | 11/2007 | Shapiro | F01D 11/08 415/115 |
| 7,704,039 B1 | 4/2010 | Liang | |
| 8,439,629 B2 | 5/2013 | Pietraszkiewicz et al. | |
| 8,596,962 B1 | 12/2013 | Liang | |
| 8,596,963 B1 | 12/2013 | Liang | |
| 8,740,551 B2 | 6/2014 | Di Paola et al. | |
| 2007/0059178 A1 * | 3/2007 | Shapiro | F01D 11/08 416/181 |
| 2013/0205793 A1 | 8/2013 | Xu | |

* cited by examiner

COOLING PASSAGES FOR GAS TURBINE ENGINE COMPONENT

STATEMENT REGARDING FEDERALLY SPONSORED RESEARCH OR DEVELOPMENT

This invention was made with government support under Contract No. FA 8650-09-D-2923-0021 awarded by the United States Air Force. The Government has certain rights in this invention.

BACKGROUND

This disclosure relates to a gas turbine engine, and more particularly to a blade outer air seal (BOAS) that may be incorporated into a gas turbine engine.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades.

An engine case of an engine static structure may include one or more blade outer air seals (BOAS) that establish an outer radial flow path boundary for channeling the hot combustion gases. BOAS are typically mounted to the engine casing with one or more retention hooks.

SUMMARY

In one exemplary embodiment, a gas turbine engine component includes a wall portion that includes a first side and a second opposite side. A plurality of passages extends between the first side of the wall portion and the second side of the wall portion and includes a plurality of inlets located on the first side of the wall portion. A plurality of outlets are located on a second side of the wall portion. The plurality of outlets includes a first plurality of outlets located on a first side of the plurality of inlets and a second plurality of outlets located on a second side of the plurality of inlets.

In a further embodiment of any of the above, the first plurality of outlets and the second plurality of outlets are positioned in an alternating pattern.

In a further embodiment of any of the above, the first plurality of outlets are located upstream of the plurality of inlets and the second plurality of outlets are located downstream of the plurality of inlets.

In a further embodiment of any of the above, the first plurality of outlets are located on a first circumferential side of the plurality of inlets. The second plurality of outlets are located on a second circumferential side of the plurality of inlets.

In a further embodiment of any of the above, the plurality of passages are directed in a circumferential direction.

In a further embodiment of any of the above, the plurality of passages are directed in a radial direction.

In a further embodiment of any of the above, the first plurality of outlets are located in a first linear relationship and the second plurality of outlets are located in a second linear relationship.

In a further embodiment of any of the above, the second linear relationship is parallel to the first linear relationship.

In a further embodiment of any of the above, the gas turbine engine component is at least one of a blade outer air seal, a vane, a blade, or a combustor liner.

In another exemplary embodiment, a gas turbine engine includes at least one blade outer air seal including a wall portion that has a first side and a second side. A plurality of passages extends between the first side of the wall portion and the second side of the wall portion including a plurality of inlets located on the first side of the wall portion at a first axial position. A plurality of outlets are located on a second side of the wall portion. The plurality of outlets includes a first plurality of outlets located upstream from a second plurality of outlets.

In a further embodiment of any of the above, the first plurality of outlets and the second plurality of outlets are positioned in an alternating pattern.

In a further embodiment of any of the above, the first plurality of outlets are located upstream of the plurality of inlets. The second plurality of outlets are located downstream of the plurality of inlets.

In a further embodiment of any of the above, the plurality of passages is directed in a circumferential direction.

In a further embodiment of any of the above, the plurality of inlets and the plurality of outlets are elliptical.

In a further embodiment of any of the above, a diameter of at least one of the plurality of passages increases from the first side of the wall portion to the second side of the wall portion.

In a further embodiment of any of the above, the first plurality of outlets are located in a first linear relationship and the second plurality of outlets are located in a second linear relationship parallel to the first linear relationship.

In another exemplary embodiment, a method of cooling a gas turbine engine component includes directing a cooling fluid into a first plurality of linearly arranged passages each including an inlet on a first side of the component. Film cooling a second side of the component with cooling fluid exiting the first plurality of linearly arranged passages through a first plurality of outlets that have a first linear arrangement and a second plurality of outlets that have a second linear arrangement spaced from the first linear arrangement.

In a further embodiment of any of the above, the first linear arrangement is parallel to the second linear arrangement.

In a further embodiment of any of the above, the first plurality of outlets are located upstream of each of the inlets and the second plurality of outlets are located downstream of each of the inlets.

In a further embodiment of any of the above, the component is at least one of a blade outer air seal, a vane, a blade, or a combustor liner.

DETAILED DESCRIPTION

Figure 1:
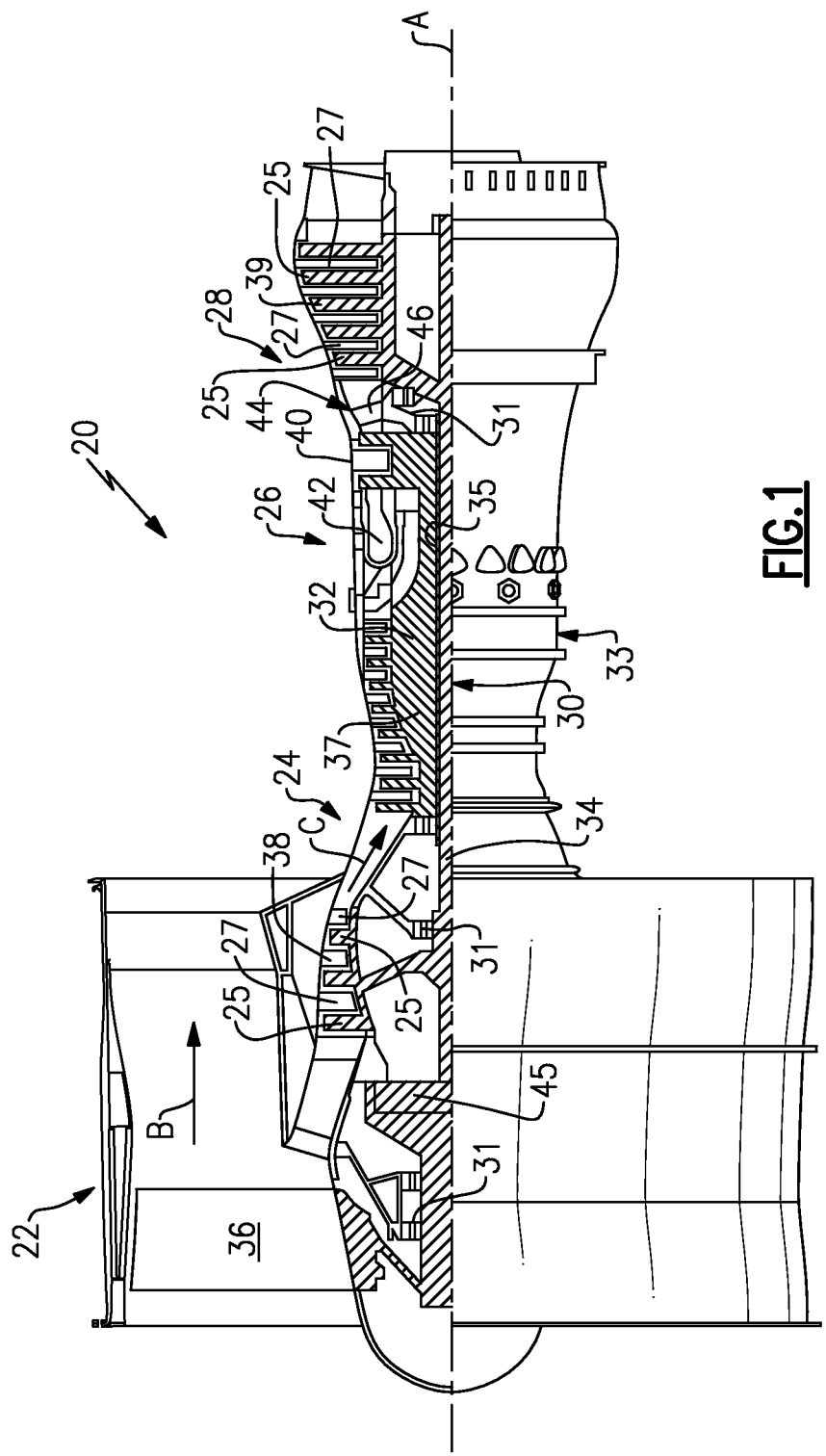
FIG. 1 is a schematic view of an example gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in this non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the fan 36 and/or the low pressure compressor 38 and the high pressure compressor 37, is mixed with fuel and burned in the combustor 42, and is then expanded through the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be calculated by measuring the pressure prior to the inlet of the low pressure turbine 39 and relating it to the pressure measured at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In one embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}° R)/(518.7° R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Figure 2:
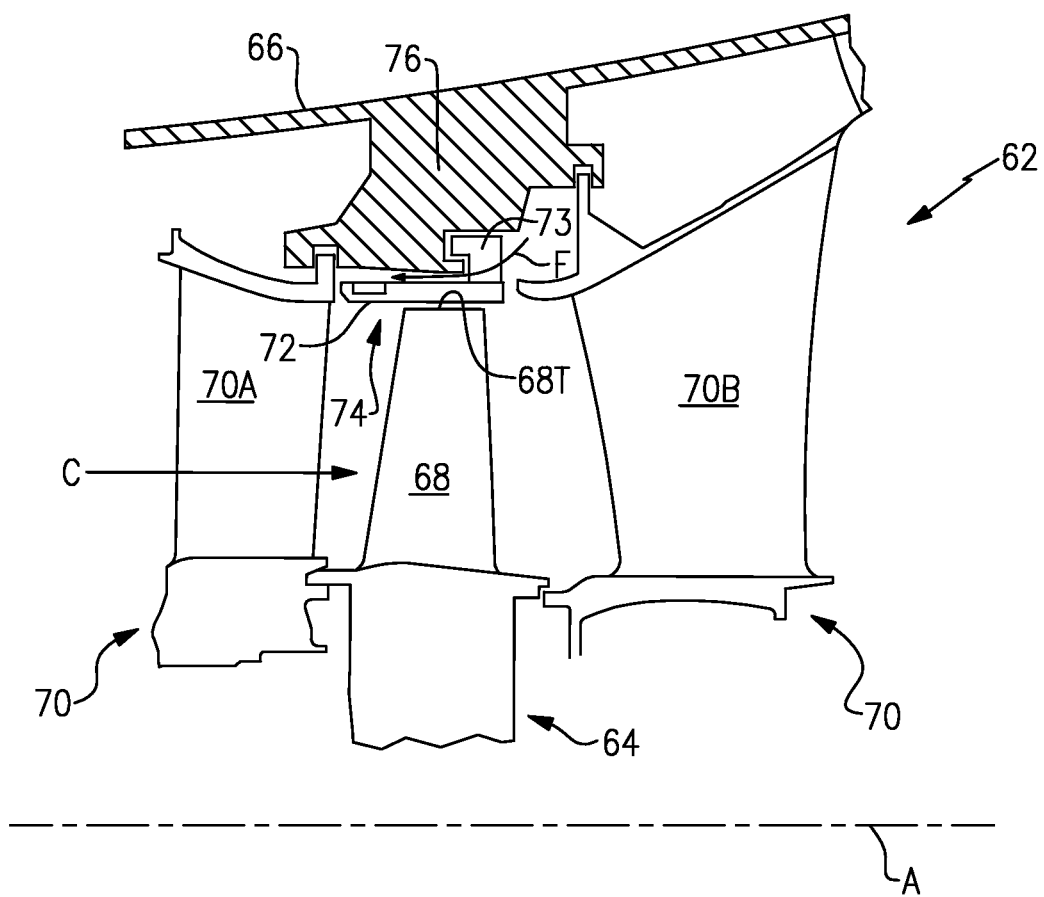
FIG. 2 illustrates a cross-sectional view of a portion of the gas turbine engine.

FIG. 2 illustrates a portion 62 of a gas turbine engine, such as the gas turbine engine 20 of FIG. 1. In the illustrated embodiment, the portion 62 is representative of the high pressure turbine 40. However, it should be appreciated that other portions of the gas turbine engine 20 could benefit from the teachings of this disclosure, including but not limited to, the compressor section 24, and the low pressure turbine 39.

In one exemplary embodiment, a rotor disk 64 (only one shown, although multiple disks could be disposed within the portion 62) is mounted for rotation about the engine centerline longitudinal axis A relative to an engine case 66 of the engine static structure 33 (see FIG. 1). The portion 62 includes alternating rows of rotating blades 68 (mounted to the rotor disk 64) and vanes (features 70A, 70B) of vane assemblies 70 that are also supported relative to the engine case 66.

Each blade 68 of the rotor disk 64 extends to a blade tip 68T at a radially outermost portion of the blades 68. The blade tip 68T extends toward a blade outer air seal (BOAS) 72 (shown schematically in FIG. 2). The BOAS 72 may be a segment of a BOAS assembly 74 and is secured to the engine case 66 with a retention member 73. For example, a plurality of BOAS 72 may be circumferentially positioned relative to one another to provide a segmented BOAS assembly 74 that generally surrounds the rotor disk 64 and the blades 68 carried by the rotor disk 64.

A cooling fluid F that is separate from the core flow path C may be communicated into a space at least partially defined by the BOAS 72 to provide a dedicated source of cooling fluid for cooling the BOAS 72 and other nearby hardware. In one embodiment, the cooling fluid F is airflow sourced from the high pressure compressor 37 or any other upstream portion of the gas turbine engine 20.

Figure 3:
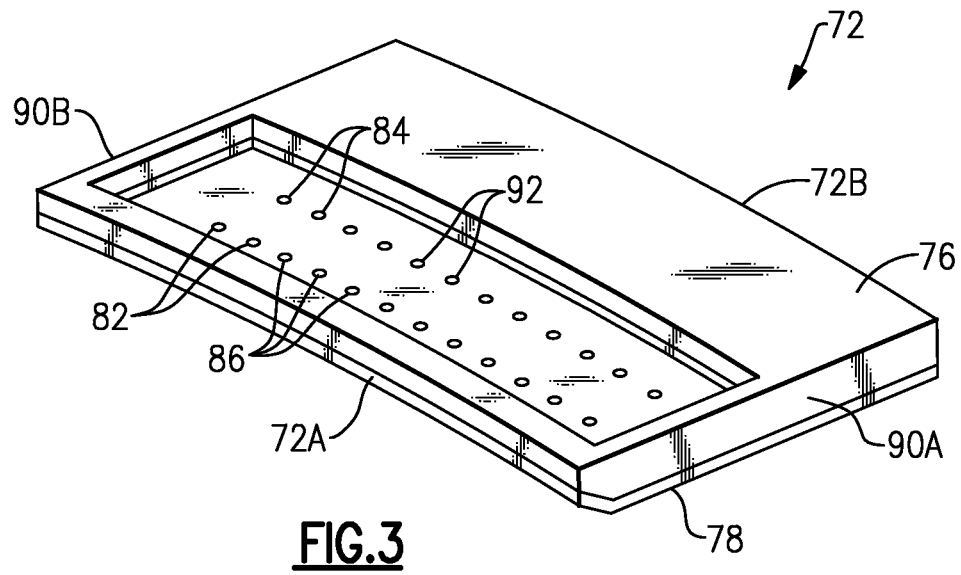
FIG. 3 illustrates a perspective view of a portion of a blade outer air seal.
Figure 4:
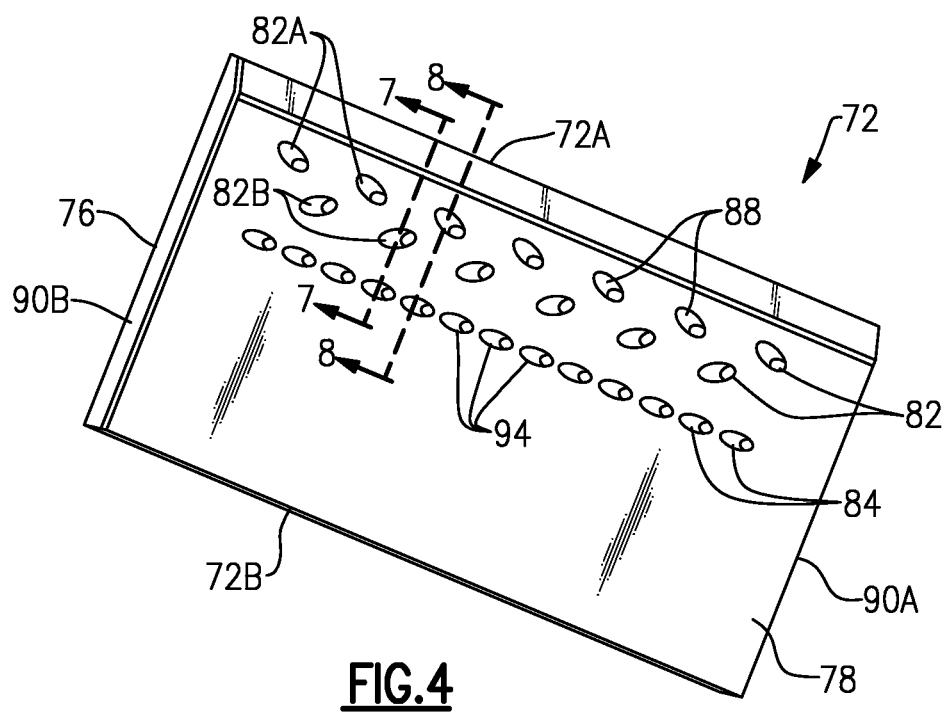
FIG. 4 illustrates another perspective view of the portion of the blade outer air seal from FIG. 3.

FIGS. 3 and 4 illustrate the BOAS 72 without a retention member 73 for securing the BOAS 72 to the engine case 66. The BOAS 72 includes a radially outer side 76 and a radially inner side 78. In this disclosure, radial or radially is in relation to the engine axis A unless stated otherwise. The BOAS 72 includes an axially upstream side 72A and an axially downstream side 72B. In this disclosure, axial or axially is in relation to the engine axis A unless stated otherwise.

The radially outer side 76 includes an impingement cavity 80 for directing the cooling fluid F through a first plurality of passages 82 and a second plurality of passage 84 in the BOAS 72. In the illustrated embodiment, the first plurality of passages 82 are axially upstream from the second plurality of passages 84. In another example embodiment, the second plurality of passages 84 could be located upstream of the first plurality of passages 82.

The first plurality of passages 82 each include an inlet 86 on the radially outer side 76 and an outlet 88 on the radially inner side 78. The first plurality of passages 82 include a cylindrical cross section and the inlet 86 and the outlet 88 each have an elliptical shape due to the non-perpendicular angle formed between an axis extending longitudinally through a center of each of the first plurality of passages 82 and the radially outer and inner sides 76, 78.

Each of the first plurality of passages 82 include a directional component that extends in a circumferential direction either toward or away from opposing first and second circumferential ends 90A, 90B of the BOAS 72. In the illustrated embodiment, the first plurality of passages 82 extends in a direction from the first circumferential end 90A toward the second circumferential end 90B. When applied to an airfoil, such as a blade or vane, each of the first plurality of passages 82 would extend in a radial direction and would be transverse to the engine axis A.

The first plurality of passages 82 also includes alternating forward and aft passages 82A, 82B that include an upstream or a downstream directional component in addition to the circumferential component discussed above. By positioning the forward passage 82A and the aft passage 82B in an alternating arrangement, a spacing between the adjacent outlets 88 is increased. By increasing the spacing between the adjacent outlets 88, the structural rigidity of the BOAS 72 is increased by reducing the concentration of material removed from the BOAS 72.

The second plurality of passages 84 includes an inlet 92 and an outlet 94. The second plurality of cooling passages 84 include a cylindrical cross section with the inlet 92 and the outlet 94 having an elliptical shape due to the non-perpendicular angle formed between an axis extending longitudinally through a center of each of the first plurality of passages 82 and the radially outer and inner sides 76, 78.

Each of the second plurality of passages 84 include a directional component that extends in a circumferential direction toward or away from either the opposing first and second circumferential ends 90A, 90B of the BOAS 72. In the illustrated embodiment, the second plurality of passages 84 extend in a direction from the first circumferential end 90A to the second circumferential end 90B similar to the first plurality of passages 82.

Figure 5:
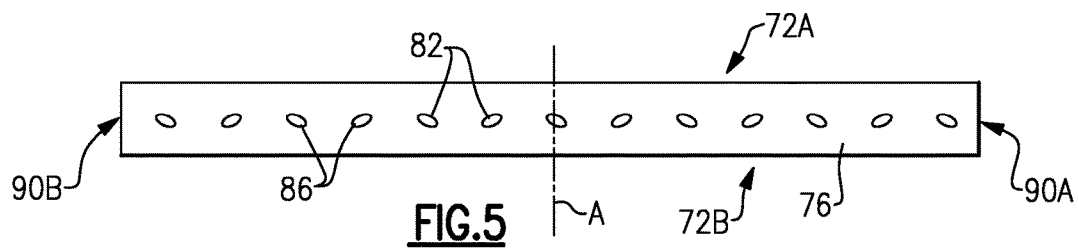
FIG. 5 illustrates an arrangement of inlets.
Figure 6:
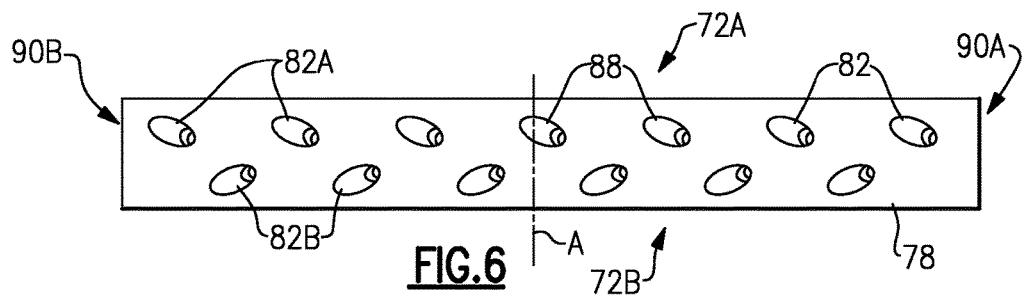
FIG. 6 illustrates an arrangement of outlets.

FIGS. 5 and 6 illustrate segments views of the radially inner and outer sides 78, 76 of the BOAS 72 surrounding the first plurality of passages 82. As shown in FIGS. 5 and 6, the inlets 86 to the first plurality of passages 82 have a constant axial position relative to the engine axis A and the outlets 88 include alternating forward and aft passages 82A, 82B that are spaced axially from each other.

In the illustrated embodiment, the inlets 86 and the outlets 88 to the forward and aft passages 82A, 82B are arranged linearly with a constant axial position. Alternatively, the inlets 86 and the outlets 88 could also be arranged linearly in an axial direction or a direction transverse across the BOAS 72 such that the forward and aft passages 82A, 82B are spaced from each other while still being parallel to each other. Similarly, the forward and aft passages 82A, 82B could be linearly arranged and be parallel to the linear arrangement of the inlets 86. Alternatively, the inlets 86 and the outlets 88 could be arranged in a non-linear arrangement.

Figure 7:
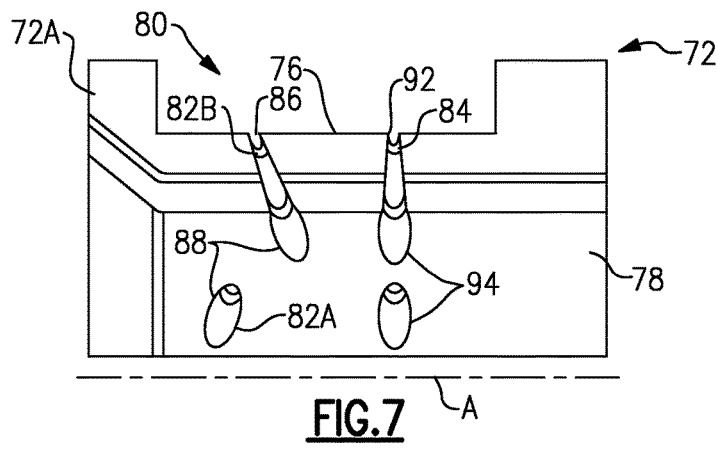
FIG. 7 illustrates a cross-sectional view taken along line 7-7 of FIG. 4.

As shown in FIG. 7, the aft passage 82B includes the directional component that extends radially inward and downstream from the upstream side 72A towards the downstream side 72B in additional to having a circumferentially directed component. The aft passage 82B includes a cylindrical cross section that increases from the radially outer side 76 toward the radially inner side 78. By directing the cooling fluid F passing through the aft passages 82B in the circumferential and aft direction, the cooling fluid F passing through the aft passage 82B will provide film cooling for the radially inner surface 78 of the BOAS 72.

Figure 8:
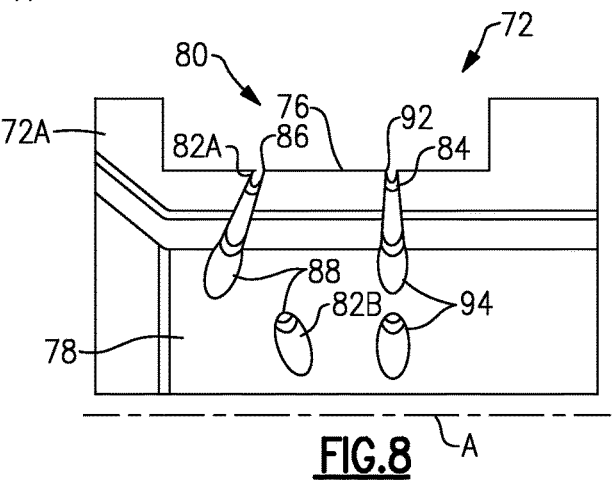
FIG. 8 illustrates a cross sectional view taken along line 8-8 of FIG. 4.

As shown in FIG. 8, the forward passage 82A includes the component that extends radially inward and upstream from the downstream side 72B towards the upstream side 72A. The forward passage 82A includes a cylindrical cross section that increases from the radially outer side 76 to the radially inner side 78. By directing the cooling fluid F passing through the forward passage 82A in the circumferential and forward direction, the cooling fluid F passing through the forward passage 82A will provide film cooling for the radially inner side 78 of the BOAS 72.

Although FIGS. 3-8 are directed to a film cooling for the BOAS 72, the disclosure could apply to any wall in a gas turbine engine that could benefit from film cooling in a wall portion, such as BOAS, vanes, blades, or combustor liner walls. The integration into a portion of the gas turbine engine 20 other than the BOAS 72 would be similar to the first and second plurality of passages shown in FIGS. 5-8.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A gas turbine engine component comprising:
a wall portion including a first side and a second opposite side; and
a plurality of passages extending between the first side of the wall portion and the second opposite side of the wall portion comprising:
a plurality of inlets located on the first side of the wall portion, wherein each of the plurality of inlets are axially aligned; and a plurality of outlets located on the second opposite side of the wall portion, wherein the plurality of outlets include a first plurality of outlets located upstream of the plurality of inlets and a second plurality of outlets located downstream of the plurality of inlets.

2. The component of claim 1, wherein the first plurality of outlets and the second plurality of outlets are positioned in an alternating pattern.

3. The component of claim 1, wherein the plurality of passages are directed in a circumferential direction.

4. The component of claim 1, wherein the plurality of passages are directed in a radial direction.

5. The component of claim 1, wherein the first plurality of outlets are located in a first axial position and the second plurality of outlets are located in a second axial position.

6. The component of claim 5, wherein the second axial position extends in a second direction parallel to a first direction of the first axial position.

7. The component of claim 1, wherein the gas turbine engine component is at least one of a blade outer air seal, a vane, a blade, or a combustor liner.

8. A gas turbine engine comprising:
at least one blade outer air seal including a wall portion having a first side and a second side; and
a plurality of passages extending between the first side of the wall portion and the second side of the wall portion comprising:
a plurality of inlets located on the first side of the wall portion at a first axial position, wherein each of the plurality of inlets are axially aligned; and
a plurality of outlets located on the second side of the wall portion, wherein the plurality of outlets include a first plurality of outlets located upstream from a second plurality of outlets.

9. The gas turbine engine of claim 8, wherein the first plurality of outlets and the second plurality of outlets are positioned in an alternating pattern.

10. The gas turbine engine of claim 8, wherein the first plurality of outlets are located upstream of the plurality of inlets and the second plurality of outlets are located downstream of the plurality of inlets.

11. The gas turbine engine of claim 8, wherein the plurality of passages are directed in a circumferential direction.

12. The gas turbine engine of claim 8, wherein the plurality of inlets and the plurality of outlets are elliptical.

13. The gas turbine engine of claim 8, wherein a diameter of at least one of the plurality of passages increases from the first side of the wall portion to the second side of the wall portion.

14. The gas turbine engine of claim 8, wherein the first plurality of outlets are located in a first axial position and the second plurality of outlets are located in a second axial position and the second axial position extends in a second direction parallel to a first direction of the first axial position.

15. A method of cooling a gas turbine engine component comprising:
directing a cooling fluid into a first plurality of linearly arranged passages, each passage of the first plurality of linearly arranged passages including an inlet on a first side of the gas turbine engine component, wherein each of the inlets of the first plurality of linearly arranged passages are axially aligned; and
film cooling a second side of the gas turbine engine component with the cooling fluid exiting the first plurality of linearly arranged passages through a first plurality of outlets having a first linear arrangement and a second plurality of outlets having a second linear arrangement spaced from the first linear arrangement, wherein the first plurality of outlets are upstream of the second plurality of outlets.

16. The method of claim 15, wherein the first linear arrangement is parallel to the second linear arrangement.

17. The method of claim 15, wherein the first plurality of outlets are located upstream of said each of the inlets of the first plurality of linearly arranged passages and the second plurality of outlets are located downstream of said each of the inlets of the first plurality of linearly arranged passages.

18. The method of claim 15, wherein the gas turbine engine component is at least one of a blade outer air seal, a vane, a blade, or a combustor liner.

* * * * *